(12) United States Patent
Choe et al.

(10) Patent No.: US 7,526,677 B2
(45) Date of Patent: Apr. 28, 2009

(54) FRAGILITY HANDLING

(75) Inventors: Calvin Choon-Hwan Choe, Redmond, WA (US); Gopal Parupudi, Sammamish, WA (US); Mukunda S. Murthy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 11/264,198

(22) Filed: Oct. 31, 2005

(65) Prior Publication Data

US 2007/0100850 A1    May 3, 2007

(51) Int. Cl.
  *G06F 11/00* (2006.01)
(52) U.S. Cl. .............................. 714/27; 714/26; 726/21
(58) Field of Classification Search ............. 714/26, 714/27; 726/2, 3, 4, 21
  See application file for complete search history.

(56) References Cited

U.S. PATENT DOCUMENTS

| | | | |
|---|---|---|---|
| 5,659,616 A | 8/1997 | Sudia | |
| 6,023,586 A | 2/2000 | Gaisford et al. | |
| 6,088,451 A | 7/2000 | He et al. | |
| 6,134,680 A | 10/2000 | Yeomans | |
| 6,154,776 A | 11/2000 | Martin | |
| 6,233,577 B1 | 5/2001 | Ramasubramani et al. | |
| 6,233,616 B1 | 5/2001 | Reid | |
| 6,275,941 B1 | 8/2001 | Saito et al. | |
| 6,301,613 B1 | 10/2001 | Ahlstrom et al. | |
| 6,321,339 B1 | 11/2001 | French et al. | |
| 6,327,550 B1 | 12/2001 | Vinberg et al. | |
| 6,389,539 B1 | 5/2002 | Hamilton, II et al. | |
| 6,393,484 B1 | 5/2002 | Massarani | |
| 6,412,077 B1 * | 6/2002 | Roden et al. ................... | 714/4 |
| 6,553,493 B1 | 4/2003 | Okumura et al. | |
| 6,564,320 B1 | 5/2003 | de Silva et al. | |
| 6,601,175 B1 | 7/2003 | Arnold et al. | |

(Continued)

FOREIGN PATENT DOCUMENTS

WO    WO 2004/002062 A1    12/2003

(Continued)

OTHER PUBLICATIONS

"The Cable Guy—Jul. 2005: Network Access Protection Platform Overview," Published: Jun. 29, 2005; Updated: May 23, 2006; [8 pages].

(Continued)

*Primary Examiner*—Marc Duncan
(74) *Attorney, Agent, or Firm*—Merchant & Gould P.C.

(57) ABSTRACT

A method is provided for handling failures in a computer system including a compliance checking system in a computer network. In response to a client computer failing to obtain a compliance check, a determination is made as to a category of an error that at least partially caused the failure in obtaining the compliance check. As a result, the method includes performing an action to at least partially based on the determined category of the error. In some instances, the action can include allowing the client computer to connect to the network. Another method includes receiving a definition of a configurable mitigation rule, where the configurable mitigation rule describes an action to perform at least partially based on the category of an error. Yet another method includes receiving a selection of a security level of operation of the compliance checking system.

14 Claims, 9 Drawing Sheets

U.S. PATENT DOCUMENTS

| | | |
|---|---|---|
| 6,611,869 B1 | 8/2003 | Eschelbeck et al. |
| 6,615,383 B1 | 9/2003 | Talluri et al. |
| 6,754,664 B1 | 6/2004 | Bush |
| 6,847,609 B1 | 1/2005 | Sarnikowski et al. |
| 6,854,056 B1 | 2/2005 | Benantar et al. |
| 6,871,284 B2 | 3/2005 | Cooper et al. |
| 6,873,988 B2 | 3/2005 | Herrmann et al. |
| 6,892,317 B1 | 5/2005 | Sampath et al. |
| 6,993,686 B1 | 1/2006 | Groenendaal et al. |
| 7,020,532 B2 | 3/2006 | Johnson et al. |
| 7,032,022 B1 | 4/2006 | Shanumgam et al. |
| 7,039,807 B2 | 5/2006 | Spitz |
| 7,043,659 B1 * | 5/2006 | Klein et al. ............. 714/4 |
| 7,046,647 B2 | 5/2006 | Oba et al. |
| 7,051,243 B2 * | 5/2006 | Helgren et al. ............. 714/48 |
| 7,100,085 B2 * | 8/2006 | Miller ............. 714/26 |
| 7,111,205 B1 * | 9/2006 | Jahn et al. ............. 714/47 |
| 7,124,326 B1 * | 10/2006 | Niikawa ............. 714/37 |
| 7,287,195 B1 * | 10/2007 | Folkesson ............. 714/44 |
| 7,389,444 B2 * | 6/2008 | Ma et al. ............. 714/26 |
| 7,392,430 B2 * | 6/2008 | Greenlee et al. ............. 714/25 |
| 7,403,901 B1 * | 7/2008 | Carley et al. ............. 705/2 |
| 7,409,594 B2 * | 8/2008 | Mukherjee et al. ............. 714/26 |
| 2001/0047514 A1 | 11/2001 | Goto et al. |
| 2002/0010800 A1 | 1/2002 | Riley et al. |
| 2002/0073308 A1 | 6/2002 | Benantar |
| 2002/0078347 A1 | 6/2002 | Hericourt et al. |
| 2002/0129264 A1 | 9/2002 | Rowland et al. |
| 2002/0144108 A1 | 10/2002 | Benantar |
| 2002/0199116 A1 | 12/2002 | Hoene et al. |
| 2003/0009752 A1 | 1/2003 | Gupta |
| 2003/0014644 A1 | 1/2003 | Burns et al. |
| 2003/0041167 A1 | 2/2003 | French et al. |
| 2003/0044020 A1 | 3/2003 | Aboba et al. |
| 2003/0055962 A1 | 3/2003 | Freund et al. |
| 2003/0055994 A1 | 3/2003 | Herrmann et al. |
| 2003/0061318 A1 * | 3/2003 | Abdelhadi et al. ............. 709/221 |
| 2003/0065919 A1 | 4/2003 | Albert et al. |
| 2003/0087629 A1 | 5/2003 | Juitt et al. |
| 2003/0097315 A1 | 5/2003 | Guerrero et al. |
| 2003/0126136 A1 | 7/2003 | Omoigui |
| 2003/0126501 A1 * | 7/2003 | Musman ............. 714/26 |
| 2003/0191966 A1 | 10/2003 | Gleichauf |
| 2003/0200464 A1 | 10/2003 | Kidron |
| 2003/0221002 A1 | 11/2003 | Srivastava et al. |
| 2004/0006532 A1 | 1/2004 | Lawrence et al. |
| 2004/0039580 A1 | 2/2004 | Steger |
| 2004/0083129 A1 | 4/2004 | Herz |
| 2004/0085944 A1 | 5/2004 | Boehm |
| 2004/0107360 A1 | 6/2004 | Herrmann et al. |
| 2004/0153171 A1 | 8/2004 | Brandt et al. |
| 2004/0153791 A1 * | 8/2004 | Arend ............. 714/26 |
| 2004/0153823 A1 | 8/2004 | Ansari |
| 2004/0167984 A1 | 8/2004 | Herrmann |
| 2004/0249974 A1 | 12/2004 | Alkhatib et al. |
| 2004/0250107 A1 | 12/2004 | Guo |
| 2004/0268148 A1 | 12/2004 | Karjala et al. |
| 2005/0015622 A1 | 1/2005 | Williams et al. |
| 2005/0021733 A1 | 1/2005 | Clinton et al. |
| 2005/0021975 A1 | 1/2005 | Liu |
| 2005/0076265 A1 * | 4/2005 | Hsu et al. ............. 714/27 |
| 2005/0081111 A1 | 4/2005 | Morgan et al. |
| 2005/0086337 A1 | 4/2005 | Quittek et al. |
| 2005/0086502 A1 | 4/2005 | Rayes et al. |
| 2005/0114502 A1 | 5/2005 | Raden et al. |
| 2005/0131997 A1 | 6/2005 | Lewis et al. |
| 2005/0138204 A1 | 6/2005 | Iyer et al. |
| 2005/0144532 A1 | 6/2005 | Dombrowa et al. |
| 2005/0144552 A1 * | 6/2005 | Kalthoff et al. ............. 714/811 |
| 2005/0165953 A1 | 7/2005 | Oba et al. |
| 2005/0166197 A1 | 7/2005 | Riley |
| 2005/0172019 A1 | 8/2005 | Williamson et al. |
| 2005/0188285 A1 | 8/2005 | Fellenstein et al. |
| 2005/0193386 A1 | 9/2005 | McCaleb et al. |
| 2005/0198527 A1 | 9/2005 | Johnson et al. |
| 2005/0229039 A1 * | 10/2005 | Anderson et al. ............. 714/23 |
| 2005/0254651 A1 | 11/2005 | Porozni et al. |
| 2005/0256970 A1 | 11/2005 | Harrison et al. |
| 2005/0267954 A1 | 12/2005 | Lewis et al. |
| 2006/0002556 A1 | 1/2006 | Paul |
| 2006/0004772 A1 | 1/2006 | Hagan et al. |
| 2006/0020858 A1 * | 1/2006 | Schaefer ............. 714/38 |
| 2006/0033606 A1 | 2/2006 | Howarth et al. |
| 2006/0036733 A1 | 2/2006 | Fujimoto et al. |
| 2006/0085850 A1 | 4/2006 | Mayfield et al. |
| 2006/0089733 A1 * | 4/2006 | Dickinson et al. ............. 700/83 |
| 2006/0143440 A1 | 6/2006 | Ponnapalli et al. |
| 2006/0164199 A1 | 7/2006 | Gilde et al. |
| 2007/0061623 A1 * | 3/2007 | Yuan et al. ............. 714/26 |
| 2007/0124803 A1 * | 5/2007 | Taraz ............. 726/4 |
| 2007/0127500 A1 | 6/2007 | Maeng |
| 2007/0143392 A1 | 6/2007 | Choe et al. |
| 2007/0150934 A1 | 6/2007 | Fiszman et al. |
| 2007/0198525 A1 | 8/2007 | Chatterjee et al. |
| 2007/0234040 A1 | 10/2007 | Hurst et al. |
| 2008/0120686 A1 * | 5/2008 | Gao et al. ............. 726/1 |

FOREIGN PATENT DOCUMENTS

| | | | |
|---|---|---|---|
| WO | WO 2004/042540 A2 | 5/2004 | |
| WO | WO 2004/046953 A1 | 6/2004 | |
| WO | WO 2005/040995 A2 | 5/2005 | |

OTHER PUBLICATIONS

Pearce, Craig; Bertok, Peter; Thevathyan, Charles. "A Protocol for Secrecy and Authentication within Proxy-Based SPKI/SDSI Mobile," School of Computer Science and Information Technology, RMIT University, 2004, pp. 1-14.

Persiano, Pino; Visconti, Ivan. "A secure and private system for subscription-based remote services," Universita di Salerno, Nov. 2003, [29 pages].

Cisco NAC—http://www.cisco.com/en/US/netsol/ns466/networking_solutions_package.html.

Discussion of Cisco NAC vs. Microsoft NAP—http://www.itarchitect.com/shared/article/showArticle.jhtml?articleId=60401143&classroom=.

Mockapetris, P., "Domain names—Implementation and Specification", RFC1035, Nov. 1987, http://www.ietf.org/rfc/rfc1035.txt.

Bradner, S., "Key words for use in RFCs to Indicate Requirement Levels", RFC 2119, Mar. 1997, http://www.ietf.org/rfc/rfc2119.txt.

Hoffman, P., "UTF-16, an encoding of ISO 10646", RFC 2781, Feb. 2000, http://www.ietf.org/rfc/rfc2781.txt.

Web Service Health Modeling, Instrumentation, and Monitoring: Developing and Using a Web Services Health Model for the Northern Electronics Scenario http://msdn.microsoft.com/library/default.asp?url=/library/en-us/dnbda/html/MSArcSeriesMCS6.asp.

Fidelia Releases Windows Version of its NetVigil™ Real-time Performance Management and Monitoring Suite http://www.fidelia.com/news/news-win-version.php.

"AAA: from Radius to Diameter," 10 pages (Sep. 18, 2003).

"Cisco Network Admission Control and Microsoft Network Access Protection Interoperability Architecture," *Cisco Systems and Microsoft Corporation*, http://www.cisco.com/en/US/netsol/ns466/networking_solutions_package.html, 8 pages (Published: Sep. 2006).

"Cryptographic Provider Names," http://msdn.microsoft.com/library/en-us/seccrypto/security/cryptographic_provider_name..., 1 page (Retrieved Oct. 10, 2006).

"Cryptography," http://msdn.microsoft.com/library/en-us/seccrypto/security/cryptography_portal.asp?frame=true, 2 pages (Retrieved Oct. 12, 2006).

"IPsec," http://www.microsoft.com/technet/itsolutions/network/ipsec/default/mspx, 4 pages (Retrieved Oct. 10, 2006.

"Lockdown Networks Unveils Switch-Level Network Access Control," *IT Observer*, http://www.ebcvg.com/press.php?id=1643, 4 pages (Sep. 13, 2005).

"Network Access Protection," http://www.microsoft.com/technet/itsolutions/network/nap/default.mspx, 4 pages (Retrieved Oct. 10, 2006).

"TPM Work Group," *Trusted Computing Group*, https://www.trustedcomputinggroup.org/groups.tpm/, 1 page (Retrieved Oct. 10, 2006).

"Windows Resource Protection," http://msdn.microsoft.com/library/en-us/wfp/setup/windows_file_protection_start_page.asp?fram, 1 page (Retrieved Oct. 12, 2006).

Bechler, M. et al., "A Cluster-Based Security Architecture for Ad Hoc Networks," *IEEE Infocom 2004*, 11 pages (Mar. 7-11, 2004).

Chong, F. et al., "Web Service Health Modeling, Instrumentation, and Monitoring Developing and Using a Web Services Health Model for the Northern Electronics Scenario," http://msdn.microsoft.com/library/en-us/dnbda/html/MSArcSeriesMCS6.asp?frame=true, 36 pages (Sep. 2005).

Cisco Systems, "Cisco Clean Access Manager Installation and Administration Guide," Release 3.5, pp. 1-62 (Jan. 2006).

Cisco Systems, "Cisco Clean Access: In-Band and Out-Of-Band Deployment Options and Considerations," White Paper, pp. 1-8 (2003).

Cisco Systems, "Cisco Clean Access: A Network Admissions Control Appliance," http://www.cisco.com/en/US/products/ps6128/products_data_sheet0900aecd802dalb5.html, 6 pages (Retrieved Sep. 26, 2005).

Cisco Systems, "Securing Complexity with NAC Appliance (Cisco Clean Access): A Technical View," *NAC Appliance Technical Marketing Team*, pp. 1-41 (Jun. 2006).

Conry-Murray, A., "Cisco NAC vs. Microsoft NAP," http://www.itarchitectmag.com/shared/article/show/Article.jhtml;jsessionid=NFZ3V0ACPV5KQSNDLPCKHSCJUN, 4 pages (Mar. 1, 2005).

Droms, R. et al., "Dynamic Host Configuration Protocol for IPv6 (DHCPv6)," RFC 3315, 100 pages (Jul. 2003).

EP Communication dated May 9, 2006 from EP Application No. 05 103 440.3-2413, 6 pages.

European Search Report mailed Aug. 18, 2005 from EP Application No. 05103440.3-2416 PCT/, 4 pages.

F5 Networks, "Best-In-Class Enterprise SSL VPN," 6 pages (Copyright 2005).

Jaganathan, K., et al.., "SPNEGO-based Kerberos and NTLM HTTP Authentication in Microsoft Windows," RFC 4559, http://www.ietf.org/rfc/rfc4559.txt, 8 pages (Jun. 2006).

Jansen, W. et al., "Policy Expression and Enforcement for Handheld Devices," 23 pages (Apr. 2003).

Johnston, W. et al., "Authorization and Attribute Certificates for Widely Distributed Access Control," *IEEE 7th International Workshops on Enabling Technologies: Infrastructure for Collaborative Enterprises—WETICE '98*, pp. 1-6 (Jun. 17-19, 1998).

Jonsson, J. et al., "Public-Key Cryptography Standards (PKCS) #1: RSA Cryptography Specifications Version 2.1", RFC 3447, 64 pages (Feb. 2003).

Liu, X. et al., "Cisco Systems' Simple Certificate Enrollment Protocol (SCEP)," http://ietfreport.isoc.org/all-ids/draft-nourse-scep-01.txt, 37 pages (Jan. 2000).

Microsoft Corporation, "Microsoft Windows Server 2003 Network Access Quarantine Control," 35 pages (Published: Mar. 2003; Updated: Oct. 2003).

Microsoft Corporation, Microsoft Windows Server System, Internet Protocol Security Quarantine in the Network Access Protection Platform, http://www.microsoft.com/technet/itsolutions/network/nap/napipsec.mspx, 31 pages (Published: Jul. 27, 2005; Updated: Oct. 14, 2005).

Microsoft Corporation, Microsoft Windows Server System, Introduction to Network Access Protection, http://www.microsoft.com/technet/itsolutions/network/nap/napoverview.mspx, 18 pages (Published: Jul. 13, 2004; Updated: Jul. 27, 2005).

Microsoft Corporation, Microsoft Windows Server System, Network Access Protection Platform Architecture, http://www.microsoft.com/technet/itsolutions/network/nap/naparch.mspx, 36 pages (Published: Jul. 13, 2004; Updated: Oct. 14, 2005).

Microsoft Releases Windows Server 2003 Service Pack 1, http://www.microsoft.com/presspass/press/2005/mar05/03-30winservsp1pr.mspx, 4 pages (Retrieved Sep. 26, 2005).

Murphy, T., "The cdma2000 packet core network," *Ericsson Review*, No. 2, pp. 88-95 (2001).

Network Access Protection, Microsoft Corporation, 7 pages (Jun. 25, 2007).

New Trusted Computing Group Formed to Advance the Adoption of Open Standards for Trusted Computing Technologies, https://www.trustedcomputinggroup.org/news/press/tcg/2003/2003_04_08_tcg_formed.pdf, 2 pages (Apr. 8, 2003).

Office Action mailed May 10, 2007 in U.S. Appl. No. 10/823,686.

Office Action mailed Dec. 12, 2007 in U.S. Appl. No. 10/973,970.

Office Action mailed Dec. 12, 2007 in U.S. Appl. No. 11/056,276.

U.S. Appl. No. 11/926,794 filed Oct. 29, 2007.

Rigney, C. et al., "Remote Authentication Dial in User Service (Radius)," RFC 2058, pp. 1-57 (Jan. 1997).

Rutishauser, U. et al., "Open reference implementation of SCEP v2 client," pp. 1-35 (Mar. 1, 2002).

Scheifler, R., "X Window System Protocol, Version 11," RFC 1013, pp. 1-101 (Jun. 1987).

Sygate Secure Enterprise, Sygate Technologies, Inc., 4 pages (Copyright 2004).

TCG Trusted Network Connect TNC Architecture for Interoperability Specification Version 1.1, Revision 2, https://www.trustedcomputinggroup.org/specs/TNC/TNC_Architecture_v1_1_r2.pdf, 40 pages (May 1, 2006).

TCG Trusted Network Connect TNC Architecture for Interoperability Specification Version 1.2, Revision 4, https://www.trustedcomputinggroup.org/specs/TNC/TNC_Architecture_v1_2_r4.pdf, 41 pages (May 21, 2007).

TCG Trusted Network Connect TNC IF-TNCCS Specification Version 1.0, Revision 2, https://www.trustedcomputinggroup.org/specs/TNC/TNC_IF-TNCCS_v1_0_r2.pdf, 21 pages (May 1, 2006).

TCG Trusted Network Connect TNC Architecture for Interoperability Specification Version 1-0, Revision 4, 39 pages (May 3, 2005).

Thompson, J. et al., "A Secure Public Network Access Mechanism," *UNIX Security Symposium III Proceedings*, 13 pages (Sep. 14-16, 1992).

Thompson, M. et al. "Certificate-Based Authorization Policy in PKI Environment," *ACM Transactions on Information and System Security*, vol. 6, No. 4, pp. 566-588 (Nov. 2003).

Thurm, S., "Cisco Acts to Take Greater Role in Virus Protection of Networks," *The Wall Street Journal*, 2 pages (Nov. 19, 2003).

White, D. et al., "NAC Solution and Technology Overview," *Cisco Network Admission Control*, vol. II: NAC Deployment and Troubleshooting, 6 pages (Jan. 19, 2007).

Wikipedia, "X Window System," http://en.wikipedia.org/wiki/X_Window_System, pp. 1-15 (Retrieved Mar. 4, 2007).

Zorn, G., "Microsoft Vendor-specific Radius Attributes," RFC 2548, pp. 1-37 (Mar. 1999).

* cited by examiner

FRAGILITY HANDLING

BACKGROUND

A typical enterprise can include a variety of computing devices including laptops, desktops, mobile devices, and servers. These computing devices can communicate with each other via different communication protocols depending on the operating system and application requirements. Systems management, which may include security management, is critical to the health of the enterprise.

A key aspect of systems management is compliance checking, which can involve ensuring that computing devices adhere to a compliance level as defined by the enterprise. For example, compliance checking may include determining whether a computing device has a defined set of operating system and/or application software patches, has a correct version of an antivirus software installed, has updated virus signatures installed, and/or has properly configured applications (e.g., a firewall). Furthermore, administrators can also track non-compliant machines and can restrict their privileges in some manner (e.g., no network connectivity) until the machines become compliant. Such restrictions are imposed due to the threat that non-compliant computing devices may pose to other computing resources on the network. Alternatively, or additionally, administrators prefer to have non-compliant machines be made compliant automatically, referred to as remediation.

SUMMARY

A failure in one or more components or in the connectivity between the components can cause compliance checking or remediation to fail, which in turn can restrict the network access privileges of a client. This can result in a loss of privileges and productivity due to the fragility of the compliance checking or remediation systems. In various embodiments, fragility detection and configurable fragility alleviation is provided which can resolve the above-mentioned problems.

An aspect of some embodiments is built-in fragility handling for compliance checking systems. This aspect can include allowing a client computer access to a network despite the client computer failing to obtain a compliance check because of a problem in one of the network components and/or in connectivity between the components.

Another aspect of some embodiments is the ability to define various categories of fragility errors including client computer errors, client communication errors, server errors, server communication errors, and unknown errors. Extended error codes can also be defined for each of the fragility categories, including additional data relating to the specifics of the fragility error. For example, a client communication category error can have an extended error code indicating that access was denied with additional data containing the name of the policy server that the client was attempting to access. Such data may facilitate troubleshooting, error reporting, and performance of root cause analysis.

Another aspect of some embodiments is enabling the definition of configurable mitigation rules dictating how fragility will be handled. In the case of a health compliance system, this can be done both at the authentication server level (i.e., centrally) and on an individual system health validator level.

Another aspect of some embodiments is the selection of a security level of operation of the compliance checking system. A first situation involves no deliberate relaxation of security policies specifically to accommodate compliance checking infrastructure failures, thereby potentially impacting, with a small probability, the business continuity and end-user productivity. In the case of a highly redundant and reliable deployment of components that form the path of compliance checking, it is possible to operate compliance checking with no lapse in the security administration. Another situation is where there is a deliberate relaxation of security policies specifically to accommodate compliance checking infrastructure failures while preserving the business continuity and end-user productivity. In the case of a less reliable deployment of the components that form the path of compliance checking, it is possible to make certain accommodations very specific to respond to infrastructure failures.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Given the significant number of functioning components (e.g., processes, machines, communication protocols, hardware) involved in a process of compliance checking and remediation of a client, there exists a possibility for failure in one or more of the components or in the connectivity between the components. Such a failure can cause compliance checking or remediation to fail, which in turn can have the effect of restricting the network access privileges of the client. This results in a loss of privileges and therefore productivity for the end-user due to fragility of the compliance checking or remediation systems, where fragility refers to an inability of the systems to allow network access when a client computer fails to obtain a compliance check.

In various embodiments, fragility detection and configurable fragility alleviation is provided. A method is provided for handling component and communication fragility when performing compliance checking of computing devices, including compliance checking such as system health compliance. A method is also provided for returning to a previous operational state as if there had been no system compliance check infrastructure in place. A method is provided for classifying fragility errors into categories. Another method is also provided for notifying a compliance system of detected fragility errors. Another method is provided for configuring a mitigation action in response to a fragility error.

Figure 1:
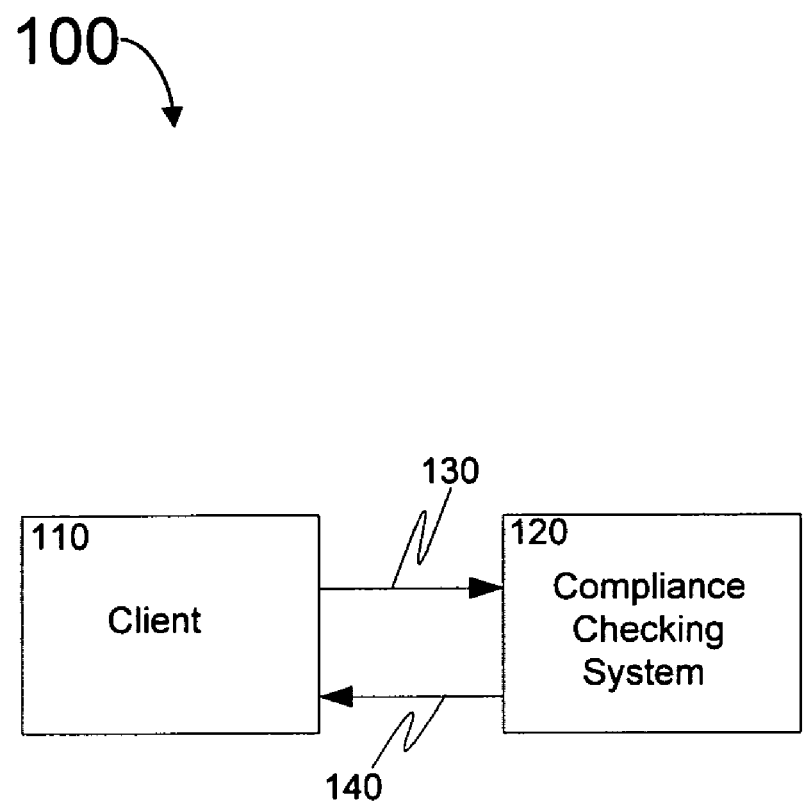
FIG. 1 is a block diagram of a computer system including a compliance checking system in accordance with one embodiment of the invention.

FIG. 1 illustrates such a computer system 100 including a compliance checking system 120. In this system, a client 110 communicates (arrow 130) with the compliance checking system 120 and submits information regarding the state of the client 110 (e.g., health state information). The compliance checking system 120 can then confirm the validity of the health state submitted by the client 110 and send information (arrow 140) back to the client 110 so as to enable the client 110 to access desired network resources (not shown).

It should be appreciated that embodiments presented herein may be applied to any compliance checking system, and need not be limited to merely a health compliance system which shall be employed as an illustrative embodiment.

Figure 2:
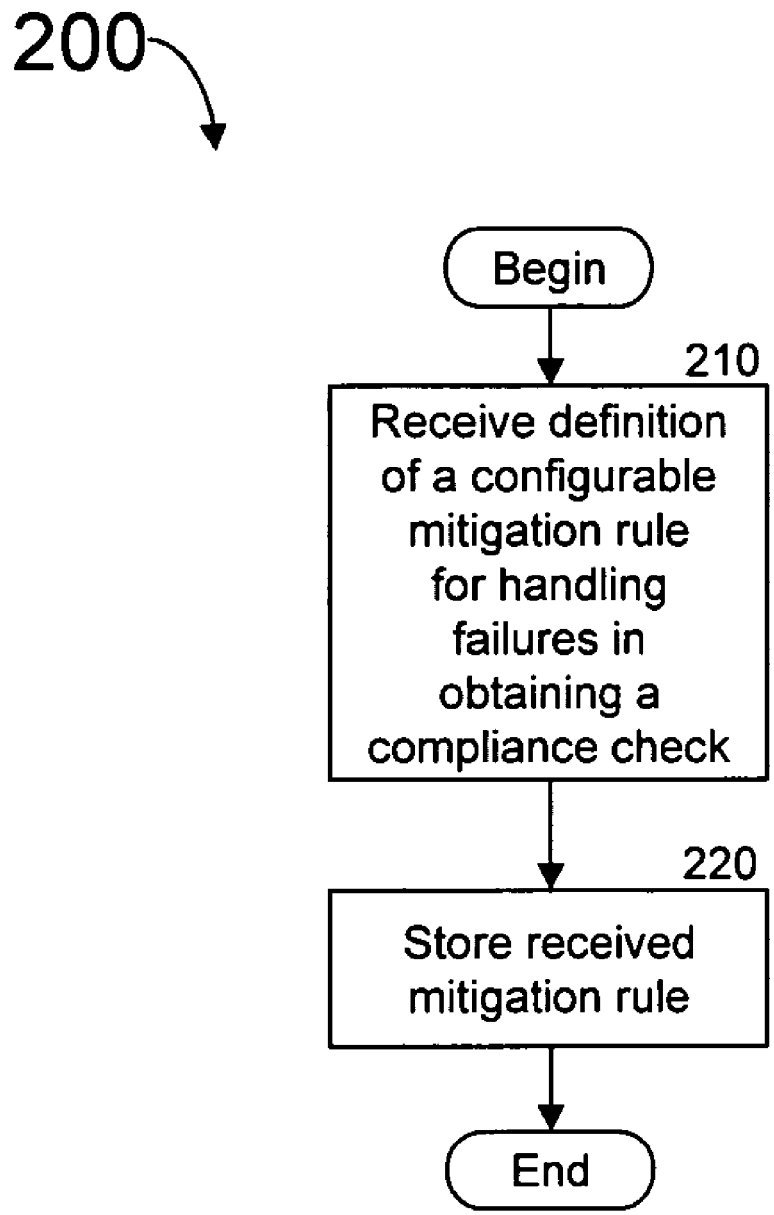
FIG. 2 is a flowchart of a process for defining a mitigation rule for handling failures in obtaining a compliance check in accordance with one embodiment of the invention.

FIG. 2 illustrates an embodiment of a process 200 for defining a mitigation rule for handling failures in obtaining a compliance check. The process 200 can be performed by any components on a computer network, for example, the compliance check system 120 of FIG. 1. Process 200 begins with an act 210 whereby a definition is received that defines a configurable mitigation rule for handling failures in obtaining a compliance check. The mitigation rule may dictate a mitigation action in response to a detected category of an error in the system that at least partially caused the failure to obtain the compliance check.

Examples of mitigation actions may include allowing a client computer to connect to the network despite the failure to obtain a compliance check, allowing probation access (i.e., allowing the client computer to connect to the network for a limited length of time), or prohibiting access. The mitigation action may be configurable, and as such, an administrator may prescribe any desirable action, as the invention is not limited in this respect.

Categories of errors that caused the failure to obtain the compliance check may include broad categories such as a client computer error, a client communication error, a server computer error, a server communication error, or an unknown error. In this context, a server may refer to at least one computer accessed by the client to obtain the compliance check. The various broad categories may in turn include subcategories detailing the specific errors that caused the failure. As such, when defining a configurable mitigation rule, an administrator may define a specific mitigation action in response to a broad and/or specific category of error.

Once the definition of the configurable mitigation rule is received, process 200 can proceed to act 220 where the received mitigation rule may stored in an appropriate location so as to be accessible by a compliance checking system. The configurable mitigation rule may be added to a collection of mitigation rules for the network, thereby defining a plurality of rules that should be followed as a result of different categories of errors.

Figure 3:
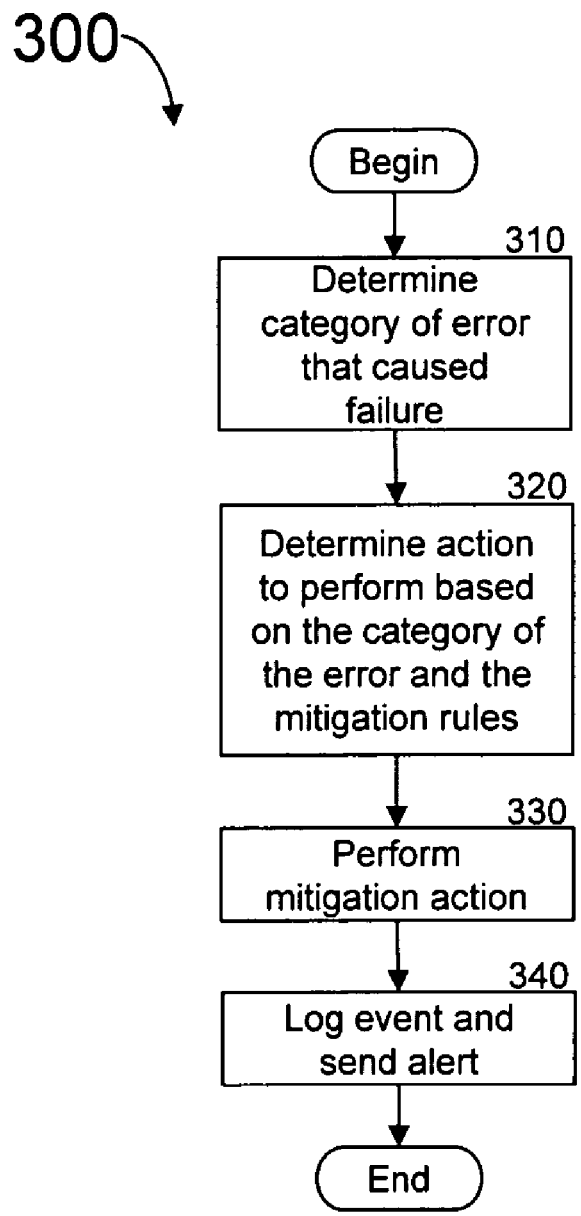
FIG. 3 is a flowchart of a process for handling a failure to obtain a compliance check in accordance with one embodiment of the invention.

FIG. 3 illustrates an embodiment of a process 300 for handling a failure to obtain a compliance check. Process 300 may be performed by a compliance checking system of a network and/or by any other suitable components, as the invention is not limited so. Process 300 can begin with act 310, where a determination is made as to a category of an error that caused the failure in obtaining a compliance check for a client computer. The determination may be made by the compliance checking system based on information provided by services executing on various computers on the network, for example on the client and/or servers.

In act 320, mitigation rules are consulted to determine which rule should be followed based on the determined category of the error (determined in act 310). Once the appropriate rule is determined, the mitigation action (or actions) may be performed (act 330) as dictated by the mitigation rule. As previously noted, mitigation actions may include allowing a client computer to connect to the network despite the failure to obtain a compliance check, allowing probative access, or prohibiting access altogether. In act 340, an event may be logged and/or an alert issued describing the detected error and any performed mitigation actions.

Figure 4:
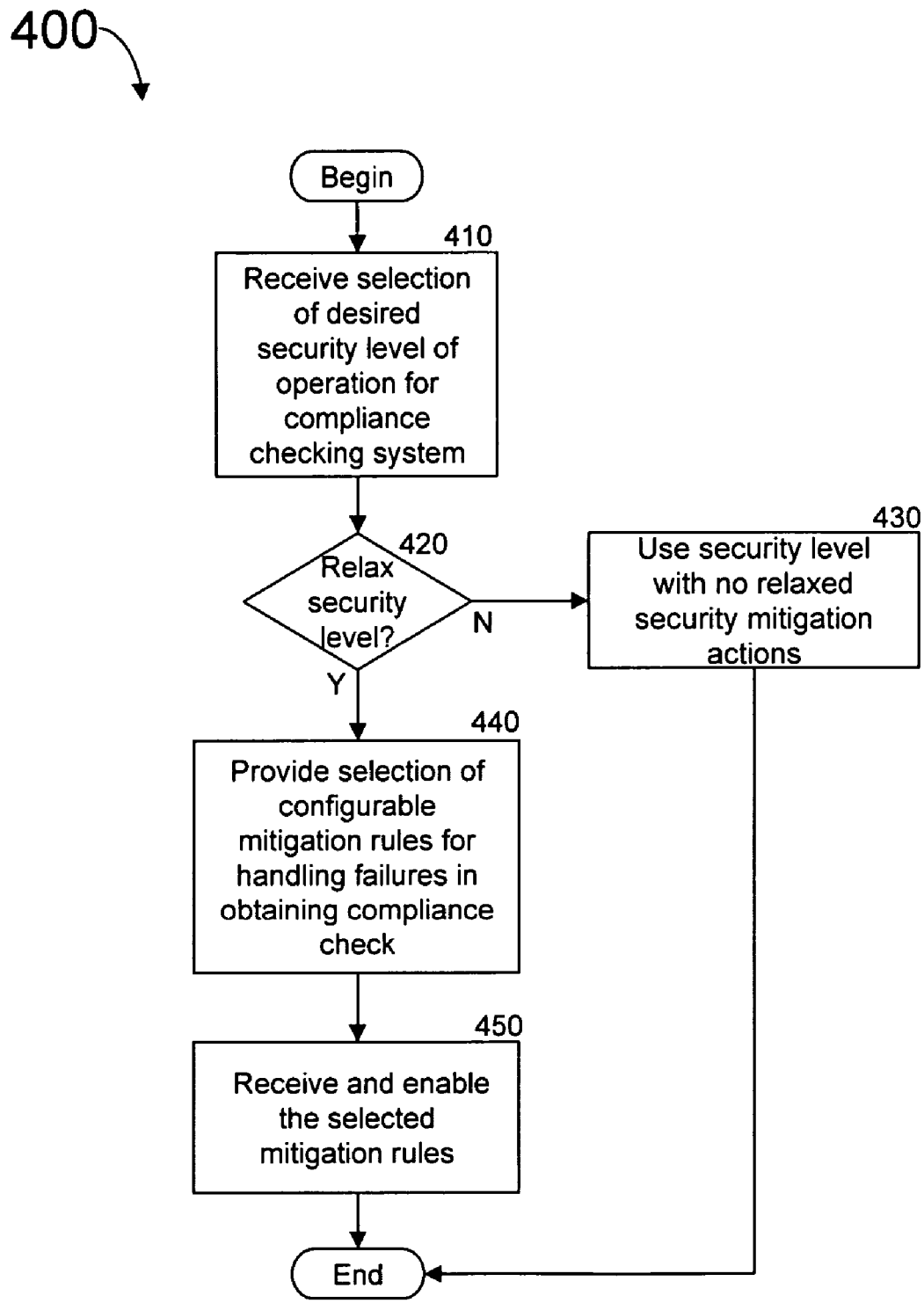
FIG. 4 is a flowchart of a process for selecting a security level of operation for a compliance checking system in accordance with one embodiment of the invention.

FIG. 4 illustrates an embodiment of a process 400 for selecting a security level of operation for a compliance checking system. Process 400 may be performed by a compliance checking system of a network, and/or by any other suitable components of a network, as the invention is not limited so.

The security level of operation of the compliance checking system can include a level wherein the security policies of the compliance checking system are relaxed. In such relaxed security levels, a client computer might be allowed to connect to the network despite a failure to obtain a compliance check. Alternatively, the client computer may be allowed to connect to the network for a limited length of time, thereby enabling a probation period wherein compliance is not mandatory. As should be appreciated, a relaxed security level may be defined by a set of mitigation rules having relaxed security mitigation actions.

Alternatively, the security level of operation of the compliance checking system can include a level wherein the security policies of the compliance checking system are not relaxed. In such a non-relaxed security level, a client computer may not be allowed to connect to the network as a result of a failure to obtain a compliance check.

Process 400 begins in act 410 where a selection (e.g., submitted by an administrator) of a desired security level of operation for a compliance checking system may be received. In act 420, a determination is made as to whether the selected security level is a relaxed security level. If the level is not a relaxed level, the process proceeds to act 430, where a non-relaxed security level is used, wherein no relaxed security mitigation actions are to be followed.

Alternatively, if a relaxed security level is selected in act 420, process 400 may proceed to act 440 where a selection of configurable mitigation rules for handling failures in obtaining a compliance check are presented to an administrator. The administrator may then select, redefine, and/or define the mitigation rules for the desired security level. In act 450, the selected mitigation rules are received and enabled so that these rules will be followed upon encountering any failures in obtaining a compliance check.

It should be appreciated that any number of modifications are possible to the aforementioned embodiments, and the embodiments may be applied to any manner of compliance checking system. For illustrative purposes, the embodiments will be described further below as applied to a health compliance system.

Figure 5:
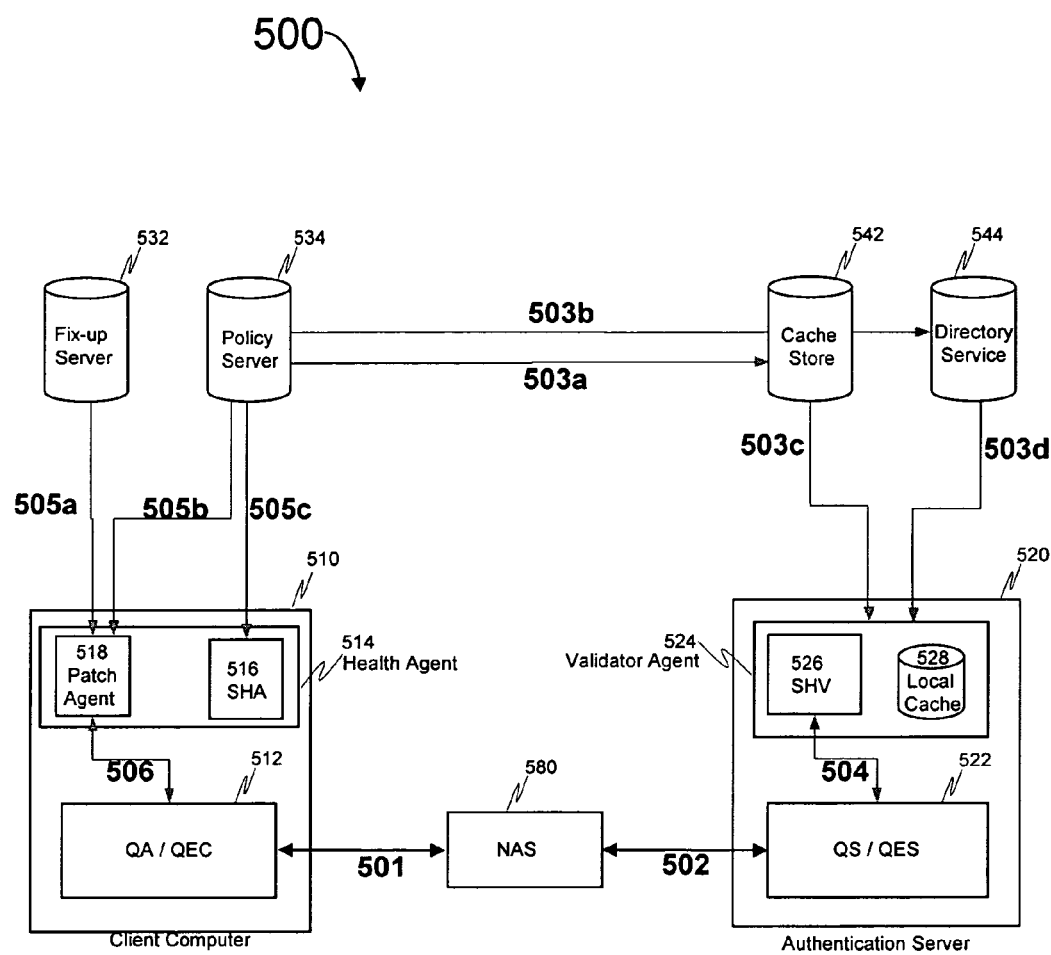
FIG. 5 is a health compliance infrastructure in accordance with one embodiment of the invention.

FIG. 5 illustrates an embodiment of a health compliance infrastructure 500. Such a health compliance infrastructure allows a client computer 510 access to a network once the client's health state is found to conform to network health policies.

Health compliance infrastructure 500 includes a client computer 510 having a quarantine agent/quarantine enforcement agent (QA/QEC) 512, and a health agent 514. The health agent 514 includes a system health agent (SHA) 516 and a patch agent 518. The SHA 516 can obtain policy definitions from a policy server 534. The patch agent 518 can obtain patch requirements from the policy server 534 and can obtain patches from fix-up server 532.

Health compliance infrastructure 500 can also include a network access server 580 that allows the client computer 510 to communicate with an authentication server 520. Authentication server 520 may include a quarantine server/quarantine enforcement service (QS/QES) 522 and a validator agent 524. The validator agent 524 may include a system health validator 526 and a local cache 528. The validator agent can communicate with a cache store 542 and/or a directory service 544 so as to retrieve policy information. The cache store 542 and the directory service 544 may communicate with the policy server 534 to retrieve the policy information. A variety of modifications may be made to the illustrated embodiment of the health compliance infrastructure 500. Some of the aforementioned components may be combined and still others may be separated. For example, the validator agent 524 may reside on a separate server from the QS/QES 522. Also, the cache store 542 and the directory server 544 can reside on the same server.

The health compliance infrastructure 500 can execute processes by which a client computer's 510 statement of health (SoH) is generated so as to describe the compliance level of the client computer 510. Such a statement of health may be determined on the client computer 510 and sent to an authentication server 520 which may attempt to validate the statement of health in order to determine the client computer's 510 health compliance. Upon validation of the statement of health, full network access or restricted network access may be provided to the client computer 510 based on the result of the statement of health validation.

Specifically, in the illustrated health compliance infrastructure 500, the SHA 516 can generate the statement of health which is sent to the SHV 526. The SHV 526 can in turn validate the statement of health for compliance. For example, a given SHA/SHV pair can validate the compliance of the client computer in having a set of prescribed software patches. Similarly, other SHA/SHV pairs can validate the compliance of the client computer in other regards, such as having an updated version of an operating system, having an operational firewall, having a correct version and signature of an antivirus software, etc., as the invention is not limited in this respect.

When the SHA 516 fails to generate a statement of health or the SHV 526 fails to validate the statement of health, fragility handling procedures can be followed. For example, the system may follow configurable mitigation rules that dictate a mitigation action, as described above. For example, fragility handling can allow the client computer 510 to temporarily request access to the network due to fragility. The authentication server 520 can be configured with mitigation rules that can dictate a response to the fragility so as to allow or not allow client access to the network. Furthermore, the response of the authentication server 520 may depend on the category of the error that caused the inability to obtain a compliance check. Categories of errors may include client computer errors, client communication errors, server errors, server communication errors, and/or other suitable error categories, as the invention is not limited in this respect. Examples of specific embodiments of mitigation rules are presented below.

Figure 6:
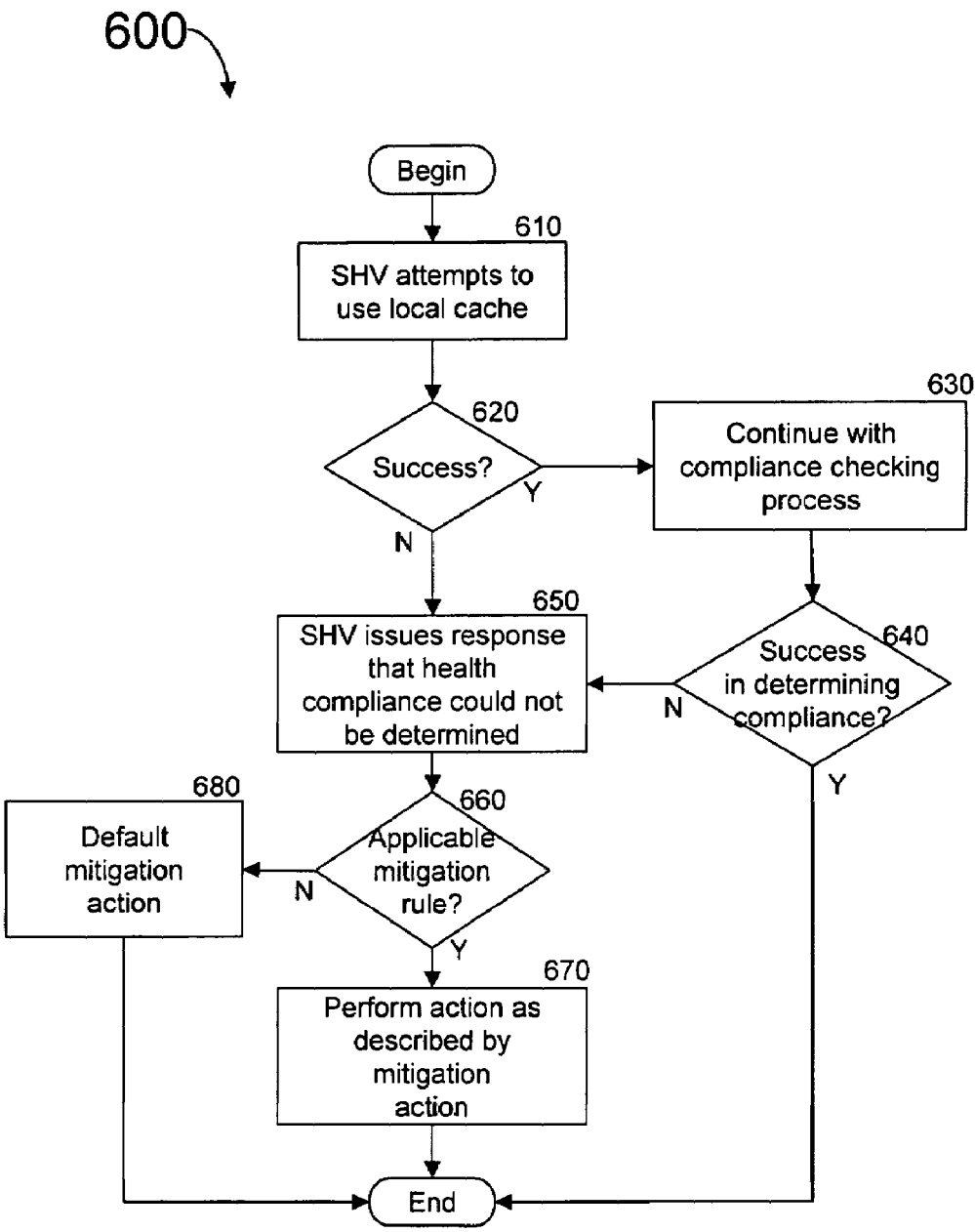
FIG. 6 is a flowchart process for reacting to failures resulting from problems on paths 503a-d, of the health compliance infrastructure of FIG. 5, and/or with the components communicating on those paths in accordance with one embodiment of the invention.

FIG. 6 illustrates an embodiment of process 600 for reacting to failures resulting from problems on paths 503a-d and/or with components communicating via those paths. For example, such a failure may occur as a result of the SHV 526 not being able to obtain policy information from the policy server 534 via cache store 542 or directory service 544, or as a result of the SHV 526 being unable to determine the validity or invalidity of the statement of health.

In response to a failure to obtain a compliance check as a result of a path 503 related error, process 600 begins with act 610, where the SHV 526 attempts to use policy information that may be stored in local cache 528 to complete the compliance check. In act 620, a determination is made as to whether the cache contains information which can be used to continue the compliance check. If the local cache 528 contains policy information which can be used to continue the compliance check process, process 600 moves on to perform act 630 where the compliance checking process continues. In act 640, a determination is made as to the success of completing the compliance check. If successful, process 600 terminates. If unsuccessful, process 600 proceeds to act 650, where the SHV 526 issues a response that the health compliance could not be determined. In response, process 600 then proceeds to determine if a mitigation rule has been defined and enabled for the category of error detected (act 660). If there exists no such mitigation rule, the process can proceed to perform a default action (act 680). For example, in the case of the illustrated process 600, the default action may be probation-based access, where the client computer 510 is allowed access the network for a limited length of time. If there does exist an applicable mitigation rule, process 600 performs the mitigation action dictated by the mitigation rule (act 670).

Figure 7:
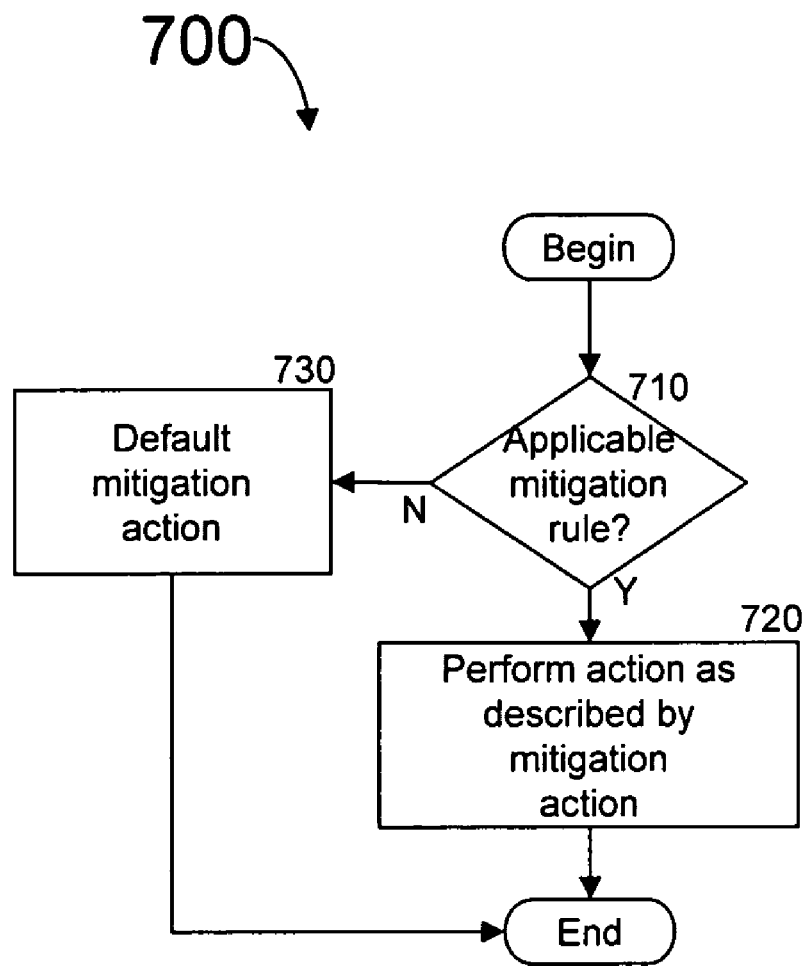
FIG. 7 is a flowchart process for reacting to failures resulting from problems on path 504, of the health compliance infrastructure of FIG. 5, and/or with the components communicating on those paths in accordance with one embodiment of the invention.

FIG. 7 illustrates an embodiment of a process 700 for reacting to failures resulting from problems on path 504 and/or with the components communicating via that path. Such a failure may occur as a result of an SHV 526 not being installed, not executing, and/or crashing or hanging during execution. In such cases, the authentication server 520 may detect an error finding the SHV 526 or as a result of a timeout in commutating with the SHV 526.

In response to a failure to obtain a compliance check as a result of a path 504 related error, process 700 begins in act 710 where a determination is made as to whether a mitigation rule has been defined and enabled for the category of error detected. If there exists no such mitigation rule, the process can proceed to perform a default action (act 730). For example, in the case of the illustrated process 700, the default action may be probation-based access, where the client computer 510 is allowed access the network for a limited length of time. If there does exist an applicable mitigation rule, process 600 performs the mitigation action dictated by the mitigation rule (act 720).

Figure 8:
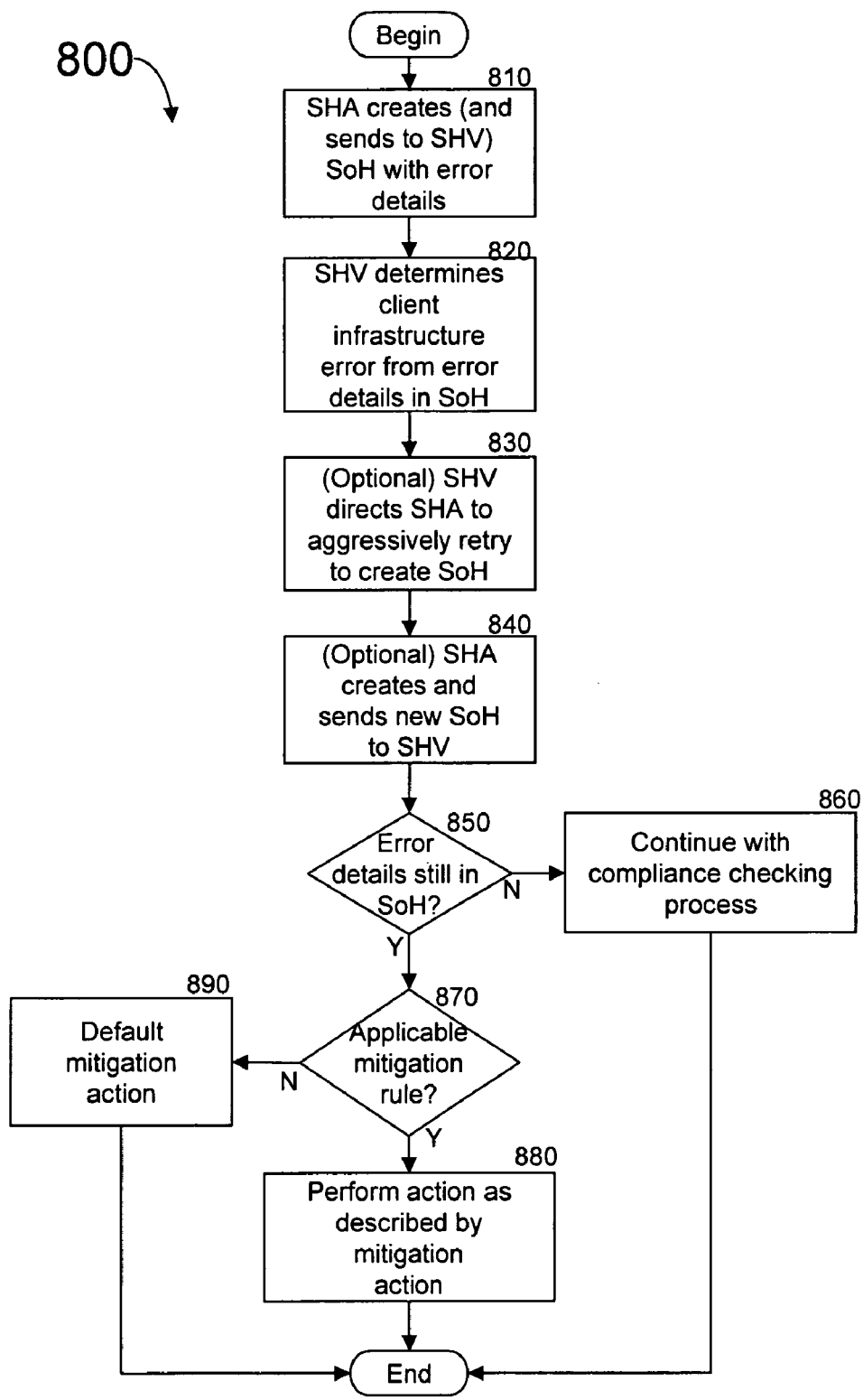
FIG. 8 is a flowchart process for reacting to failures resulting from problems on paths 505a-c, of the health compliance infrastructure of FIG. 5, and/or with the components communicating on those paths in accordance with one embodiment of the invention.

FIG. 8 illustrates an embodiment of a process 800 for reacting to failures resulting from problems on paths 505a-c and/or with the components communicating via those paths. Such a failure may occur as a result of a client not being able to access the fix-up server (e.g., as a result of the fix-up server crashing and/or a network error), a client being misconfigured (e.g., as a result of incorrect fix-up server routes, incorrect fix-up servers, or being denied access to fix-up server), and/or a client not being able to perform the fix (e.g., as a result of a failed scan, failed patch installation).

In response to a path 505 related error, process 800 begins with act 810, where the SHA 516 creates a statement of health containing error details, and the SHA 516 in turn sends the statement of health to the SHV 526. In act 820, the SHV 526 determines the client computer's infrastructure details based on error details in the received statement of health. As a result, in act 830, the SHV 526 may optionally direct the SHA 516 to aggressively retry to create another statement of health. Act 830 may be optionally performed when the SHV 526 determines retry can potentially fix the error, but if the SHV 526 determines that from the detailed error code that the error is not recoverable via a retry, process 800 can jump to act 850. In act 840, the SHA 516 creates and sends a new statement of health to the SHV 526, in response to the optional retry act 830. In act 850, a determination is made as to whether error details still exist in the statement of health. If not, process 800 continues with act 860 where compliance checking can continue. If yes, process 800 continues with act 870 where a determination is made as to whether a mitigation rule has been defined and enabled for the category of error detected. If there exists no such mitigation rule, the process can proceed to perform a default action (act 890). For example, in the case of the illustrated process 800, the default action may be allowing full connectivity, where the client computer 510 is allowed full access the network. If there does exist an applicable mitigation rule, process 800 performs the mitigation action dictated by the mitigation rule (act 880).

Figure 9:
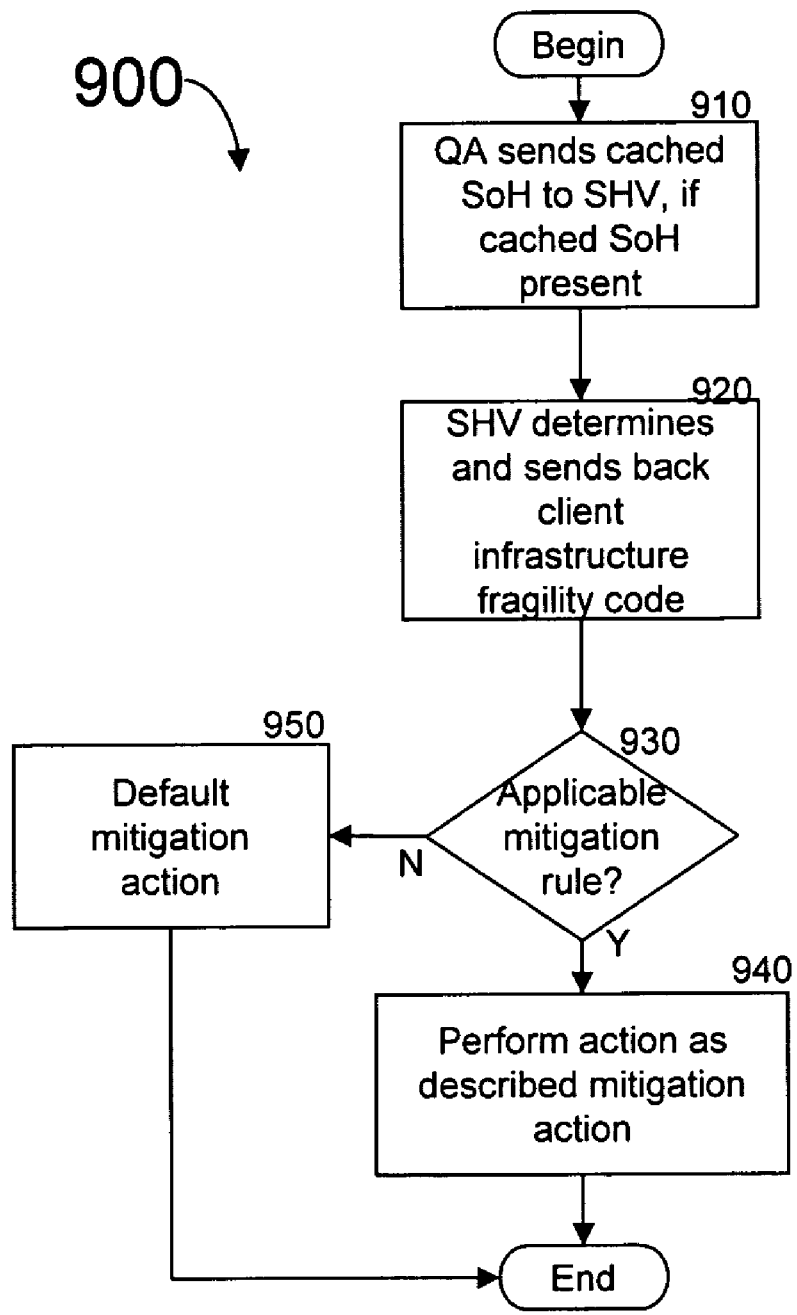
FIG. 9 is a flowchart process for reacting to failures resulting from problems on path 506, of the health compliance infrastructure of FIG. 5, and/or with the components communicating on those paths in accordance with one embodiment of the invention.

FIG. 9 illustrates an embodiment of a process 900 for reacting to failures resulting from problems on path 506 and/or with the components communicating on that path. Such a failure may occur as a result of SHA 516 crashing and/or encountering errors.

In response to a path 506 related error, process 900 begins with act 910, where the QA 512 sends a locally cached statement of health to the SHV 526, if such a cached statement is present, otherwise an empty statement of health may be sent. In act 920, the SHV 526, based on an empty statement of health or the cached statement of health with a client error, then sends back any client infrastructure fragility error code determined from the received statement of health.

The process then proceeds to act 930 where a determination is made as to whether a mitigation rule has been defined and enabled for the category of error detected. If there exists no such mitigation rule, the process can proceed to perform a default action (act 950). For example, in the case of the illustrated process 900, the default action may be allowing full connectivity, where the client computer 510 is allowed full access the network. If there does exist an applicable mitigation rule, process 900 performs the mitigation action dictated by the mitigation rule (act 940).

In another embodiment, a process is provided for reacting to failures resulting from problems on path 502 and/or with the components communicating on that path. Such a failure may occur as a result of the network access server 580 not being able to communicate with the authentication server 520. In such a process, a mitigation rule may be stored on the network access server 580, so that the network access server 580 can react to the failure. In one such embodiment, the default mitigation action can allow the client computer 510 access to the authentication server 520 by using a full address of the authentication server 520.

In should also be appreciated that in some embodiments, a process for reacting to failures on some paths and/or with the components communicating via those paths need not be modified as compared to a system not having fragility handling. In one such embodiment, failures resulting from problems on path 501, and/or with the components communicating via that path, may be handled in a similar manner as if fragility handling was not enabled.

As should be appreciated from the foregoing, there are numerous aspects of the present invention described herein that can be used independently of one another, including the aspects that relate to relaxing a security level of a compliance checking system, defining categories for fragility errors, and defining mitigation rules for fragility error handling.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A computer-implemented method of handling failures in a computer system including a compliance checking system in a computer network, the method comprising computer-implemented acts of:
   (A) receiving, at a server computer, a statement of health from a client computer, wherein the statement of health describes the health of the client computer;
   (B) attempting, by the server computer, to use the statement of health to complete a compliance check of whether the client computer complies with at least one network health policy;
   (C) in response to a failure of the compliance check caused by the inability of the server computer to determine whether the client computer complies with the at least one network health policy, determining a category of an error that at least partially caused the failure of the compliance check, wherein the category of the error is at least one of: client communication error, server communication error and server computer error; and
   (D) performing an action at least partially based on the determined category of the error.

2. The method of claim 1, wherein the action comprises allowing the client computer to connect to the network.

3. The method of claim 2, wherein the action is at least partially performed on the server.

4. The method of claim 1, wherein the act (D) is performed according to a configurable mitigation rule.

5. Computer storage media for handling compliance check failures, the computer storage media encoding instructions that, when executed by a computer, perform computer-implemented acts comprising:
   (A) receiving, at a server computer, a statement of health from a client computer, wherein the statement of health describes the health of the client computer;
   (B) attempting, by the server computer, to use the statement of health to complete a compliance check of whether the client computer complies with at least one network health policy;
   (C) in response to a failure of the compliance check caused by the inability of the server computer to determine whether the client computer complies with the at least one network health policy, determining a category of an error that at least partially caused the failure of the compliance check, wherein the category of the error is at least one of: client communication error, server communication error and server computer error; and
   (D) performing an action at least partially based on the determined category of the error.

6. The computer storage media of claim 5, wherein the action comprises allowing the client computer to connect to the network.

7. The computer storage media of claim 6, wherein the action is at least partially performed on the server computer.

8. The computer storage media of claim 6, wherein the action comprises directing a network access computer to permit restricted access by the client computer.

9. The computer storage media of claim 5, wherein the act (D) is performed according to a configurable mitigation rule.

10. A server computer system for handing failure of compliance checks of a client computer, the system comprising:
    at least one processor;
    a memory, communicatively coupled to the at least one processor and containing instructions that, when executed by the at least one processor, perform the following steps:
    (A) receiving the statement of health from the client computer, wherein the statement of health describes the health of the client computer;
    (B) attempting to use the statement of health to complete a compliance check of whether the client computer complies with at least one network health policy;
    (C) in response to a failure of the compliance check caused by the inability of the server computer system to determine whether the client computer complies with the at least one network health policy, determining a category of an error that at least partially caused the failure of the compliance check, wherein the category of the error is at least one of: client communication error, server communication error and server computer error; and
    (D) performing an action at least partially based on the determined category of the error.

11. The system of claim 10, wherein the action comprises allowing the client computer to connect to the network.

12. The system of claim 11, wherein the action is at least partially performed on the server computer system.

13. The system of claim 11, wherein the action comprises directing a network access computer to permit restricted access by the client computer.

14. The system of claim 10, wherein the act (D) is performed according to a configurable mitigation rule.

* * * * *